United States Patent [19]
Owens

[11] Patent Number: 6,076,927
[45] Date of Patent: Jun. 20, 2000

[54] ADJUSTABLE FOCAL LENGTH EYE GLASSES

[76] Inventor: Raymond L. Owens, 262 A E. 2nd St., New York, N.Y. 10009

[21] Appl. No.: 09/291,674

[22] Filed: Apr. 14, 1999

Related U.S. Application Data

[60] Provisional application No. 60/092,362, Jul. 10, 1998.
[51] Int. Cl.[7] ................................................. G02C 5/20
[52] U.S. Cl. .............................................. 351/118; 351/41
[58] Field of Search .......................... 351/41, 111, 118, 351/158

[56] References Cited

U.S. PATENT DOCUMENTS

4,676,609 6/1987 Matsui ..................................... 351/118

*Primary Examiner*—Huy Mai
*Attorney, Agent, or Firm*—St. Onge Steward Johnston & Reens LLC

[57] ABSTRACT

Eyeglasses including a stationary frame and a lens frame mounted slidably on the stationary frame between an initial position in which each of interconnected pair of lenses of the lens frame is secured within a respective eyepiece of the stationary frame and an extended position in which the pair of lenses are in front of the eyepieces, and an actuator linearly displacing the lens frame between the normal and extended positions.

15 Claims, 6 Drawing Sheets

ADJUSTABLE FOCAL LENGTH EYE GLASSES

This application is a continuation-in-part of U.S. Provisional Application No: 60/092,362 filed on Jul. 10, 1998.

FIELD OF THE INVENTION

The invention relates to eye glasses, and more particularly to an eyeglasses frame adapted to adjust focal length for persons with impaired vision who wear bifocals.

BACKGROUND OF THE INVENTION

Medical community had realized long ago that nearsighted persons who wear bifocals have the approximately thirty feet of uncorrected space due to a stationary glass frame with respect to a wearer's face. This uncorrected space results in blurry vision for such wearers of bifocals. Responding to this problem, wearers usually attempt to displace bifocals fore and aft in front of their faces. Usually such displacement covers approximately a distance between a quarter inch and a maximum of approximately one inch before wearers feel comfortable. In response to this problem, quite a few attempts dealing with adjustable frames for a pair of eye glasses have been made.

Thus, the U.S. Pat. No. 5,162,824 to Klemka discloses an adjustable lens spectacle including a rigid front frame and mounted parallel thereto a slidable rear frame. The rear frame is provided with a drive motor contained within a respective temple leg, and a drive means coupling the motor with the rear frame for effecting reciprocation of the rear frame relative to front frame. The frame is further provided with a reversing switch mounted outside the frame. A distance at which the rear frame travels is grossly inadequate to compensate for the uncorrected space mentioned above. Further, a cross plate (11) serving as a guide for the rear frame is esthetically unappealing because the displaceable frame cannot fit the front frame, thereby increasing the overall size of the disclosed pair of eyeglasses. Typically, a wearer of the assembled pair of eyeglasses (10) would experience considerable inconvenience because the overall structure is neither compact nor light.

U.S. Pat. to Kaye sets forth a device for aiding vision of images primarily for magnifying a television picture. The device includes a pair of spectacles, comprising eye-piece lenses mounted in a frame, and binocular objective lenses disposed in front if each eye-piece lens and supported by an extension to the frame of spectacles. The device further has a means for displacing objective lenses along the optical axis.

U.S. Pat. No. 3,659,931 discloses an eyeglasses frame having a manually adjustable means for individually moving each lens toward and away from the wearer's eye to vary the lens-eye separation for optimum focus.

Generally, the known prior art does not disclose a light, compact pair of eyeglasses provided with a pair of lenses synchronously displaceable between a normal position in which the lenses are secured within respective eyepieces and an extended position in which the lenses travel at a distance between a quarter inch to a maximum of one inch.

Typically, the known prior art does not teach a compact pair of eyeglasses provided with a single lens frame controllably displaceable by an actuator, which is received in a pair of temple pieces, between normal and extended positions thereof and a programmable means also mounted in the temple pieces for controlling the actuator, thereby bringing the lens frame to automatically selected positions thereof.

Finally, all of the known prior art devices may rather have a complicated mechanical structure prone to frequent malfunctioning because the wearer should adjust optimum focus every time she uses the frame and because the components are exposed to unnecessary and easily avoidable stresses.

SUMMARY OF THE INVENTION

It is therefore an object of the present invention to provide new and improved eye glasses overcoming the drawbacks of the known prior art.

It is another object of the invention to provide a pair of eye glasses adapted to vary a focal length between the lens of the glasses and the wearer's eyes to compensate uncorrected space that occurs for near sighted persons wearing bifocals.

Yet another object of the invention is to provide a simple inexpensive structure of a pair of eye glasses designed to eliminate inconveniences encountered by near sighted persons in trying to determine an optimum focal length between the lens and the wearer's eyes without moving the frame of the eye glasses.

A further object of the present invention is to provide a pair of eye glasses having an automatically adjustable structure adapted to correct the above mentioned thirty feet of uncorrected space.

Still another object of the present invention is to provide a pair of eye glasses having a means for memorizing previously established optimum positions of the lens with respect to the wearer's eyes In view of the foregoing disadvantages of the known prior art and the objects set forth above, the invention provides a pair of eye glasses with an adjustable focal point to compensate for the approximately thirty feet of uncorrected space that occurs for near sighted persons who wear bifocals.

According to the invention, a means is incorporated into a pair of eye glasses for varying the focal length between the lens of the glasses and the wearer's eyes without moving the frame of the eye glasses. This allows the user to effectively compensate for the uncorrected space without displacing the lens frame fore and aft of their faces.

The frame according to the invention comprises a set of lenses movably mounted upon a frame which is stationary on the wearer's face. The frame further includes a pair of customary eye pieces attached with a bridge and two temple pieces which extend behind the wearer's ears for a secure fit. Located on each temple piece is an actuator adapted to displace the eye pieces at a distance of up to one inch from the wearer's eyes.

According to one embodiment of the present invention, the actuator includes a rotatable toothed pinion. Operatively connected with the eye pieces is an assembly including lenses corresponding to the shape of the eye pieces mounted on a cross-frame and having respective side rails extending along the temple pieces. Each of the side rails is provided with a rack teething of the pinion located on the temple piece of the frame.

Thus, through the action of the rack and pinion upon rotation of the pinions, the lenses are movable fore and aft in front of the frame. This action can be achieved manually by the addition of a knob connecting the two pinions for uniform, simultaneous action when the knob is rotated.

According to another embodiment of the present invention, this action can be automated through the use of battery-operated circuitry, which would move the lenses fore and aft to compensate for the uncorrected space in response to the wearer's actuation of the system. Miniaturization makes possible construction of such a system in a pair of glasses having essentially the same weight as normal eye glasses.

BRIEF DESCRIPTION OF THE DRAWINGS

The above and other objects, features and advantages will become more readily apparent from the following detailed description of the invention when considered in conjunction with the accompanying drawings, in which.

DETAILED DESCRIPTION OF THE INVENTION

Figure 1:
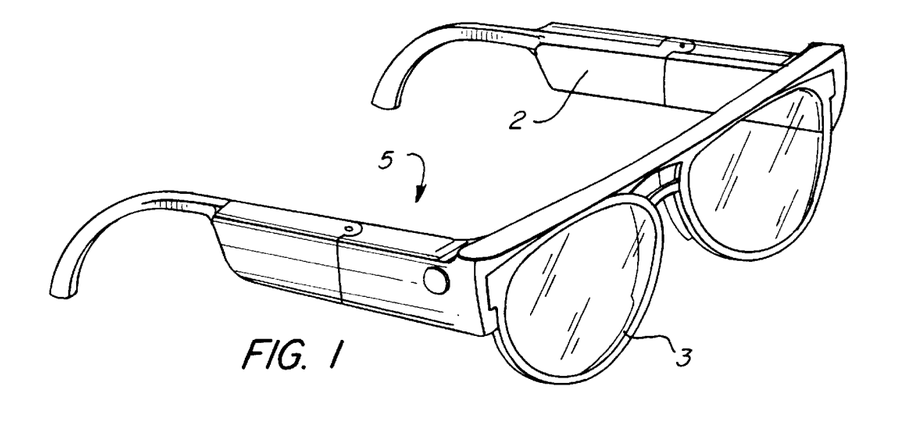
FIG. 1 is perspective view of a pair of eyeglasses according to the invention.

Referring to FIG. 1, eyeglasses 1 includes a frame 2 and a pair of focal lenses 3 received in the frame. It should be understood, of course, that the eyeglasses according to the invention may have limitless designs. The only requirement to be met is that the eyeglasses should be esthetically appealing and practical in every day use. In other words, the eyeglasses according to the invention should be light, compact and reliable. Particularly, many of the mechanical parts are made of elastomeric material. Preferably, the frame parts are injection molded components.

Figure 2:
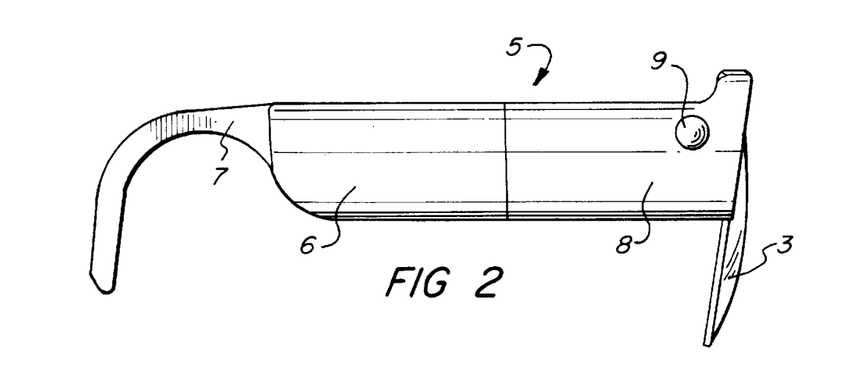
FIG. 2 is a side plane view of a temple piece of the eyeglasses shown in FIG. 1.
Figure 3:
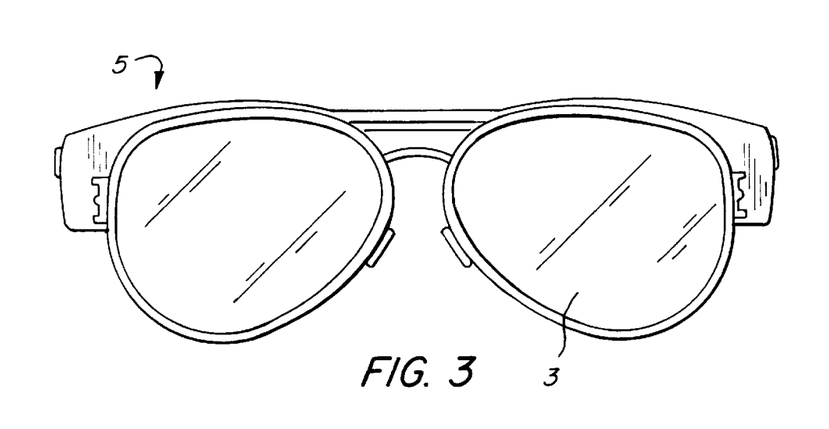
FIG. 3 is a front plane view of the eyeglasses shown in FIG. 1.

Each temple piece 5 and its association with an actuating mechanism are of identical construction, whereas the description relative to one of the temple piece is equally applicable to the other temple piece. FIG. 2 shows a right elongated temple piece 5 in an unfolded position in which it extends along a longitudinal axis A—A. The temple piece includes a rear frame 6 formed with an ear-engaging part 7 and a front frame 8 extending toward an eyepiece 15 and operatively connected therewith. Each of the front and rear frames defines a respective inner compartment receiving an actuating means for axially displacing a lens frame 4 that carries lenses 3. An opening 9 is provided in the vicinity of a front end of the temple piece 5 and receives a switch, which when depressed by a user turns on an actuating means displacing the lens frame 4. The ear-engaging part 7, as illustrated in FIGS. 1–10, is formed unitarily with the respective rear frame 6. Clearly, the rear frame and the ear-engaging parts can be molded separately and then be coupled together by any suitable means which provide, of course, axial alignment of the entire temple piece during adjustment of the lenses.

Figure 10:
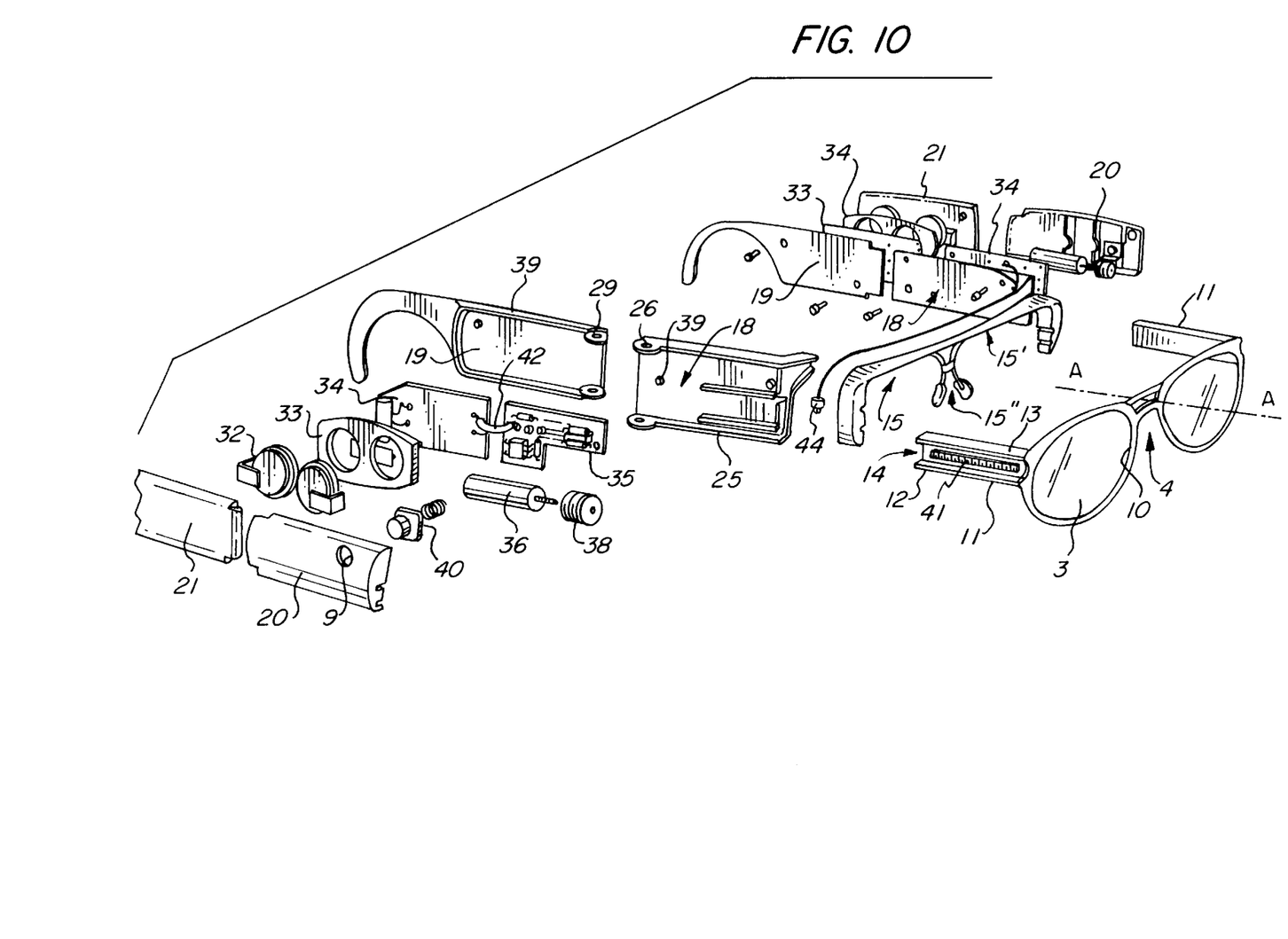
FIG. 10 is an exploded view of the pair of eye glasses of FIG. 1 according to the one embodiment shown in FIGS. 4–5 and 8–9.

Turning to FIG. 10, the eyeglasses 1 is formed with an axis of symmetry A—A. The lens frame 4 has a pair of side rails 11 extending rearwardly from a support 10. Each of the side rails 11 is formed with a pair of top and bottom side walls 12,13 extending laterally outwardly and forming an inner channel 14 which is formed with a respective rack 12. As seen from FIG. 10, the side piece has generally a U-shaped cross-section. However, this cross-section may have different shapes and the only condition it has to meet is that it should be possible to form a guide, as will be explained below. Bridging the temple pieces is a cross piece 15' formed with a pair of spaced apart flanges 16 which along with nose pads 15" form the eyepieces 15. The side rails 11 are flanked between the flanges 16.

Figure 4:
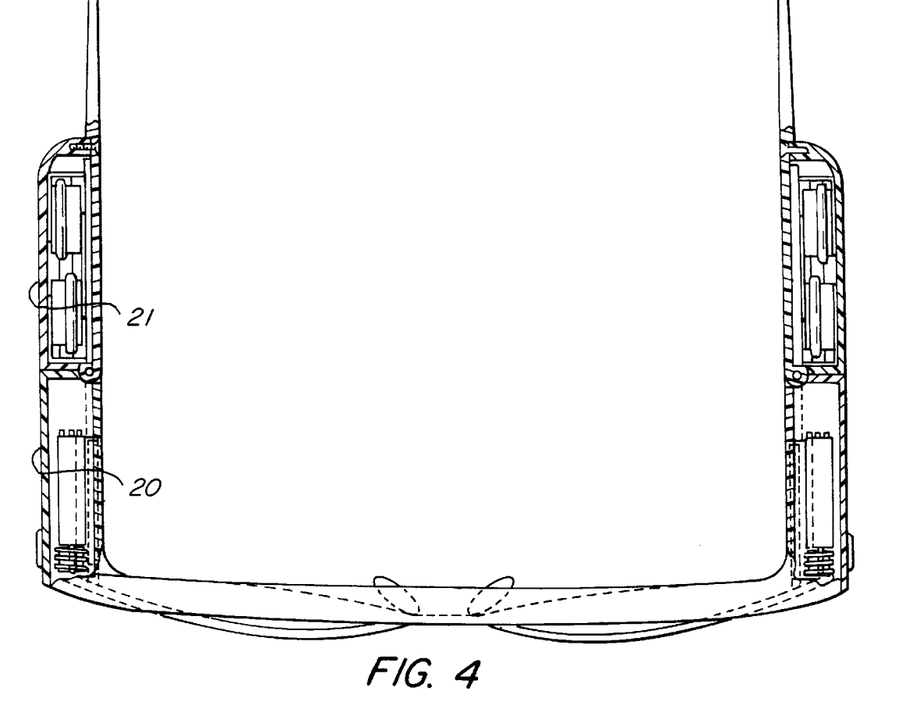
FIG. 4 is a top partially cut away view according to one embodiment of the eyeglasses shown in FIG. 1.
Figure 5:
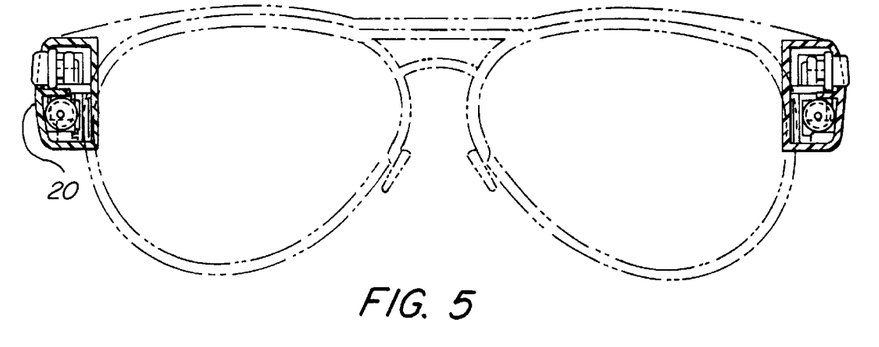
FIG. 5 is a front partially cut away view of the embodiment shown in FIG. 4 of the eyeglasses shown in FIG. 1.
Figure 6:
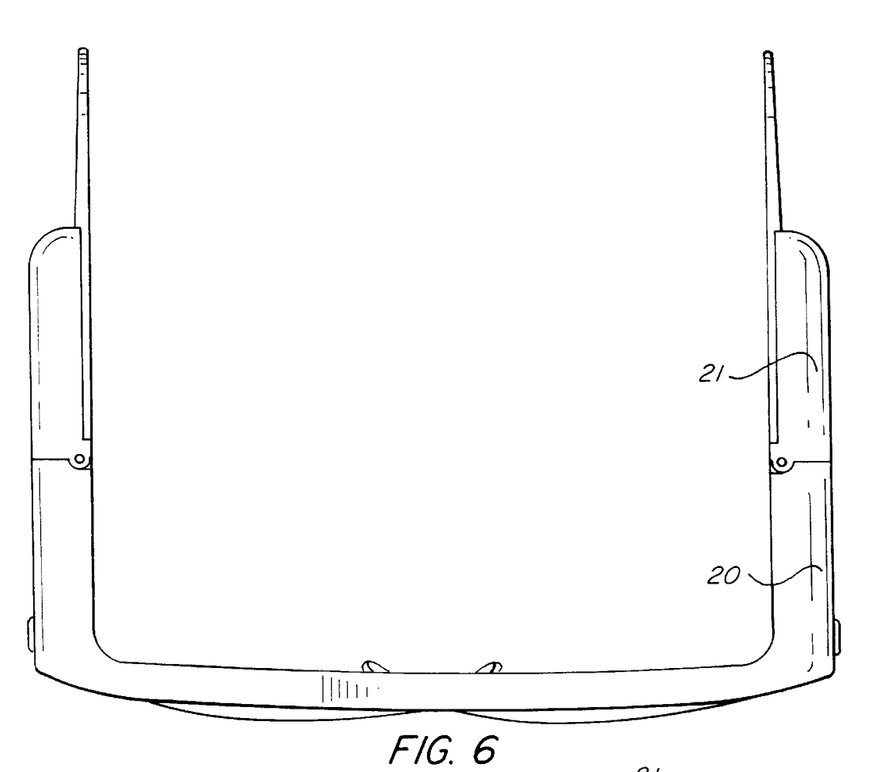
FIG. 6 is a top plane view of the eyeglasses shown in FIG. 1 in its unfolded position.
Figure 7:
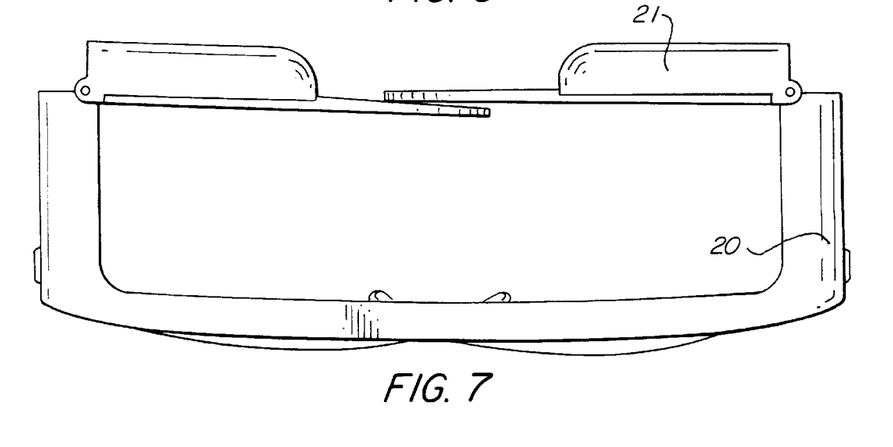
FIG. 7 is a top plane view of the eyeglasses shown in FIG. 1 in its folded position.
Figure 8:
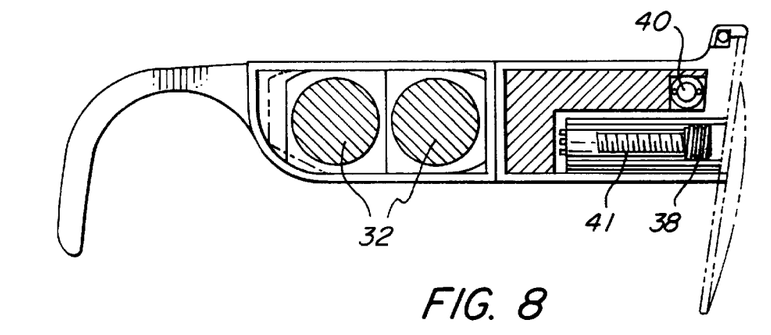
FIG. 8 is a cross-sectional view of the temple shown in FIG. 2 of the eyeglasses of FIG. 1 according to one embodiment of the invention illustrated in FIGS. 4 and 5 and provided with an adjusting mechanism which is shown in its retracted position.

As mentioned above, each of the temple pieces 5 has the respective front and rear frames 8 and 6 forming the respective inner compartment. To form such compartment, each of the frames 6 and 8 includes outer and inner pieces juxtaposed with each other upon assembly. Particularly, the temple frame is formed with an inner base 18 and an outer cover 20, while the rear frame includes an inner base 19' and an outer cover 21. At least one of these bases and covers of each frame should be formed with a trough defined by any suitable cross-section. Thus, either the base or the cover can have a C-shaped or U-shaped cross-section. It is always possible to have both halves of the temple piece 5 formed with respective bottoms extending laterally from each other. FIG. 4, for example, illustrates the covers 20 and 21 having respective outer walls laterally removed from the respective bases. It should be appreciated that the overall thickness of each temple pieces is not unreasonably enlarged, if at all. As seen in FIG. 5 illustrating the pair of eyeglasses in its full size, the temple pieces are rather of a regular size.

The front end of the front frame is molded with a flange 19 extending laterally inwardly toward the axis A—A and receiving a respective tooth 22 formed on a rear edge of the cross piece 15'. The flange 16 of the cross-piece 15' is formed with a surface extending complimentary with a front surface 23 of the base 18 and reliably interconnected therewith. As shown in FIG. 10, the flange 16 of the cross piece 15' has a pair of teeth 17 extending laterally outwardly and engaging respective notches 24 formed on the cover 20 of the temple frame 8, thereby providing alignment and necessary stiffness of the frame upon assembling.

The base 18 of the front frame 8 also has a pair of guide surfaces 25 receiving therebetween the side walls 12, 13 of the side rail 11 in a manner that provides a continuous contact between the juxtaposed surfaces upon axial displacement of the lens frame 4. A rear end of the base 18 extends laterally outwardly and has a pair of spaced apart coaxial holes 26 which are aligned with respective openings 29 of the bottom 19 of the rear frame 6 of the temple pieces upon assembling of the entire unit. A pin extending through the aligned holes completes the assembly of the inner part of the temple piece 5, thereby providing pivoting of the rear frame about the pin from an unfolded position of the eyeglasses shown in FIG. 6 to a folded position illustrated in FIG. 7.

Each of the bases 18 and 19 is formed with a respective peripheral groove 30 adapted to reliably receive a peripheral edge of the respective cover 20 and 21, so that the covers and bottoms of the temple and rear frames 8, 6 joined together define therebetween the inner compartment of the temple piece 5. Another way to assemble the respective frames is to provide each of them with at least one respective fastener extending through the respective halves of the frames. The necessary condition for use of any fastener connecting the halves of each frame is to have easy access by a user to the compartments.

While each temple piece, as described above, has two separate pieces, it is foreseeable to mold each temple piece in one piece and provide bellows or any other flexible means which is capable of pivoting the rear frame relative to the front frame between folded and operative positions to the eyeglasses. It is also conceivable to form a pivoting means between the rear frame of the temple pieces and the ear-engaging piece which can make the frame even more compact in the folded position.

Figure 9:
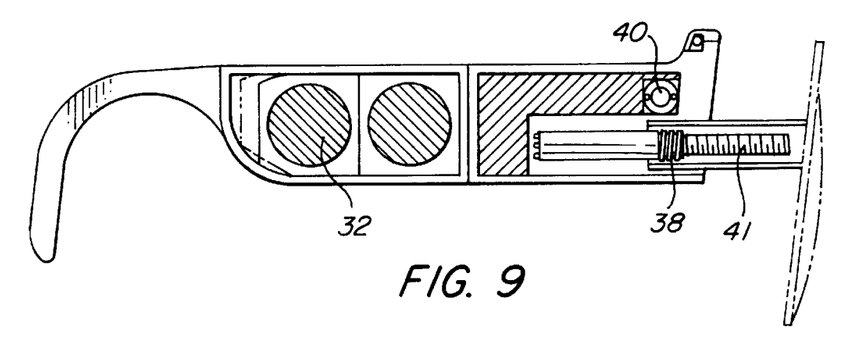
FIG. 9 is a cross-sectional view of the temple shown in FIG. 2 of the eyeglasses of FIG. 1 according to the one embodiment illustrated in FIGS. 4 and 5 and including an adjusting mechanism which is shown in its extended position.

Each of the compartments receives an actuating mechanism denoted 31. In general, the actuating mechanism, adapted to move the lens frame axially to help a user establish the optimum focal length, includes a battery unit 32 which can be directly mounted on a battery holder 33. A casing of the holder 33 is formed with solder lugs and has respective sleeves receiving the batteries. Adjacent to the holder 33 is a rear PC board 34 operatively connected to a front PC board 35. A gear motor 36 connected to the front PC board 35 and formed with a shaft 38 actuates a worm gear 37 which rotatably engages a rack 41 molded in the channel 14 of the side rail 11. The worm gear is preferably made of plastic. Rotation of the worm gear causes the rails 11 formed with respective racks, which are guided along the guide surfaces 25, to move axially thereby displacing the lens frame 4 between a normal position shown in FIG. 8 and a fully extended position as illustrated in FIG. 9. Understandably, such displacement can be stopped at any desirable distance from the eyes of a user.

The actuating mechanism further includes a spring loaded reversing switch 40 extending through the opening 9 of the temple frame 8 and electrically connected to the battery unit 32 which energizes the actuating mechanism. As mentioned above, an integral part of the actuating mechanism is a combination of the front and rear PC board. The rear PC board 34 carries the holder 33 battery unit 32 and is electrically connected to the front PC board 35 by means of a flexible electrical cord 42. Each of the front PC boards is designed to have a respective means 43 for plugging in the motor 36. However only one of the front boards is provided with an electronic means including a CPS motor controller and a data storage means used for storing desirable positions of the lens frame 4 which have been previously established by a user. The controller can be programmed with application of specific work cycles. The motor 36 is a brushless DC gearmotor with a diameter of three to five millimeters. Such motors have the low inertia providing almost instantaneous changes in direction and high torques at low speeds. Both front and rear PC boards are mounted on the respective bases of the front and rear frames by means of any suitable fasteners received in openings 39.

The actuating mechanisms mounted on the right and left temple pieces are electrically connected in parallel by means of a wire harness 44. Hence, pressing either of the switches causes simultaneous actuation of each motor to effect selective reciprocal displacement of the lens frame 4 away and toward the user's eyes.

Preferably, each battery unit includes a pair of nickel hydride 1.2 Volt rechargeable batteries which have the best weigh to storage ratio. The use of four of the batteries can sustain a drain of 120 mA for three (3) seconds and hold 4.5 volts. Such power unit can sustain approximately 500 operating cycles before requiring recharging, which can be done overnight.

The operation of the eyeglasses is simple and reliable. Although different application programs are within the scope of the invention, the following sequence of operations of the controller has been found to be preferable. Pressing the switch 40 and holding it causes travel of the frame 4. Upon releasing the switch, because of low inertia of the brushless gearmotors, displacement of the frame 4 stops instantaneously. If a user finds this particular position suitable, she simply taps twice to program actuator in this position. Two taps thereafter will position the lens at that travel distance. Finally, one tap is necessary to reverse to start position.

Figure 11:
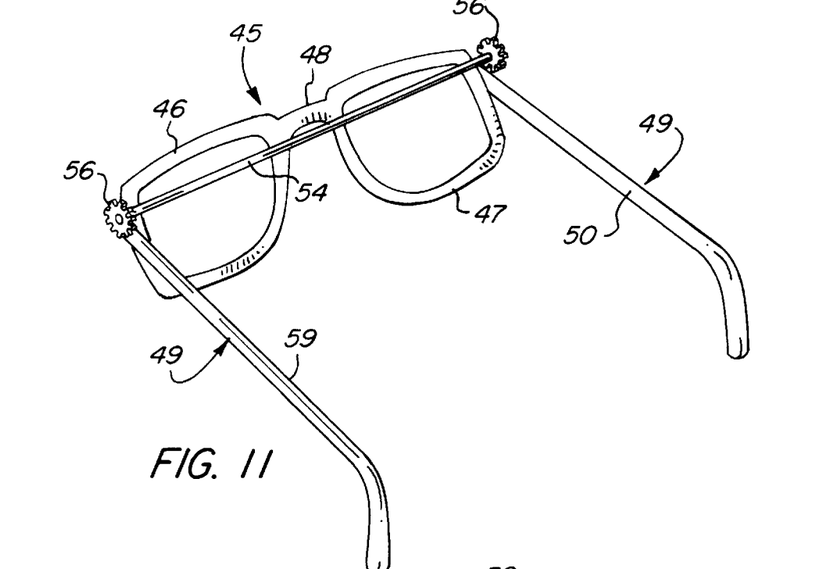
FIG. 11 is a schematic of a frame of another embodiment of the pair of eye glasses shown in FIG. 1.
Figures 12, 13:
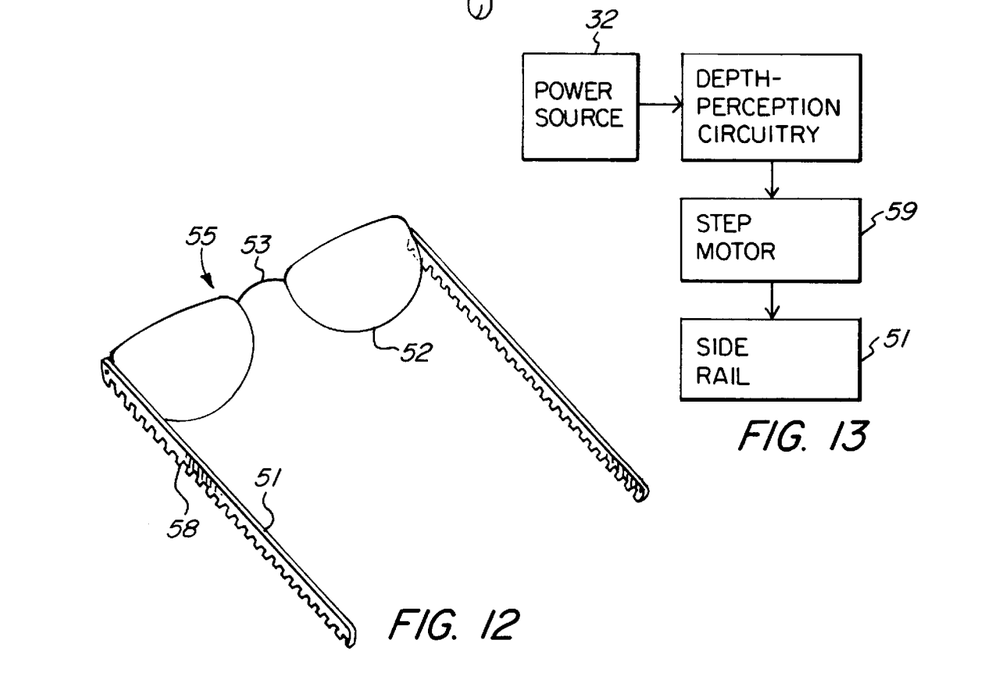
FIG. 12 is a schematic of a set of lenses mounted on the frame according to the embodiment shown in FIG. 11 of the eyeglasses of FIG. 1.
FIG. 13 is a block diagram of a controlling means.

FIG. 11 and 12 illustrate another embodiment of the present invention differing from the previously discussed embodiment by its simplicity. A frame 45 includes a pair of customary eyepieces 46, 47 operatively connected with respective temple pieces 49 and attached with a bridge 48. Completing the frame's structure is a cross axle 54 which extends along an upper edge of the eyepieces and the bridge 48 and formed between the temple pieces. The cross axle has at least one pinion 56 enclosed by a respective sleeve 50, which is formed in the front end of the temple piece.

Each sleeve 50 is adapted to receive a respective side rail 51 of a lens frame 55. The frame 55 further includes a pair of lenses 52 corresponding to the shape of the eyepieces 46, 47 and connected by a bridge 53. Each of the rails 51 has a respective rack teething 58 which is formed upon the lower edge of each rail and cooperates with the pinion 56 of the frame 45.

In order to displace the lenses 52 fore and aft in front of the frame 45, a wearer simply actuates the pinion 56, extending through a recess formed in the respective sleeve, and establishes the most convenient position of the lenses 52 with respect to the wearer's eyes. It is understood that two pinions 56 can be easily utilized to operate the structure illustrated in FIGS. 11 and 12.

Displacement of the lenses can also be actuated through the use of battery-operated depth perception circuitry couple with small pulse motors 59 shown schematically in FIG. 13. This system would work under similar principles as automatically focussing cameras. Adjustment of the motorized embodiment could also be achieved through the use of a rocker switch.

It should be appreciated that the invention is not limited to the above described embodiments. Accordingly, any and all modifications, variations, or equivalent arrangements which may occur to those skilled in the art, should be considered to be within the scope of the present invention.

What is claimed is:

1. Eyeglasses comprising:
 a pair of eyepieces connected to one another and spaced equidistantly from an axis of symmetry;
 a pair of temple pieces each formed with a respective front portion operatively connected to the respective one of the eyepieces and extending axially rearwardly therefrom;

a lens frame formed with a pair of lenses attached to one another and a pair of elongated side rails flanking said pair of lenses therebetween and fixed to the lenses, each of the side rails being slidably received by the respective one of the front portions of the temple pieces in a normal position of the lens frame in which the pair of lenses is secured within the eyepieces; and an actuator operatively connected to said temple pieces and to said side rails and synchronously moving the lens frame between an extended position thereof in front of the eyepieces and the normal position.

2. Eyeglasses defined in claim 1 wherein said actuator mechanism includes:

an axle extended between the temple pieces and formed with opposite ends mounted on the front portions of the temple pieces;

two pinions mounted on the opposite ends of the axle to rotate synchronously thereon upon starting the actuator, and two rack teethings each formed on the respective side rail and synchronously meshing with the pinions.

3. Eyeglasses defined in claim 1 wherein the actuator includes at least one power source and at least one battery-operated pulse motor mounted on one of the temple pieces and synchronously displacing the lenses between the normal and extended positions thereof at the push of a button mounted on one of the temple pieces.

4. Eyeglasses defined in claim 3 wherein the actuator further includes second power source and second pulse motor mounted on the other temple pieces, the actuator being provided with a rocker switch.

5. Eyeglasses defined in claim 1 wherein each of the temple pieces is formed with a respective interior, the actuator including:

a pair of gear racks each formed in a respective one of the side rails, a pair of battery-operated gearmotors each received in the interior of the respective temple piece and formed with a respective rotatable shaft, and a pair of worm gears each mounted rotatably fixed on the shaft of the respective gearmotor and rotatably engaging the gear rack of the respective side rail to synchronously displace the side rails with lenses between the normal and extended positions.

6. Eyeglasses defined in claim 5 wherein the actuator further includes a programmable controller operatively connected with the gearmotors to controllably select a preferable position previously chosen by a wearer.

7. Eyeglasses defined in claim 5 wherein each gear rack is molded into a bottom of the respective side rail having a U-shaped cross-section, each front portion of the respective temple piece being formed with a pair of spaced apart guide surfaces receiving therebetween the respective side rail for synchronously axially guiding the pair of lenses.

8. Eyeglasses defined in claim 5 wherein each temple piece is formed with a respective pair of inner base and outer cover defining the interior of the temple piece therebetween, each one of the opposite end flanges of the axle being formed with at least one formation received in a respective notch of the outer cover of the respective temple piece.

9. Eyeglasses defined in claim 1 wherein the actuator is provided with a battery-operated programmable controller for automatically operating displacement of the side rails according to a selected sequence of operations.

10. Eyeglasses defined in claim 9 wherein the actuator further includes a pair of switches each mounted on the respective temple piece and connected in parallel to synchronously actuate two battery packs, each of which is received in the respective temple piece, the programmable controller controlling a direction of rotation the motors, which enable displacement of the guide rails in a previously selected position of the pair of lenses.

11. Eyeglasses defined in claim 1 wherein the cross axle is provided with opposite end flanges extending angularly therefrom and a pair of nose pads centered on the axis and extending generally parallel to the opposite end flanges, each one of the end flanges of the axle and nose pad defining a respective one of the eye pieces therebetween, each end flange and the front portion of the respective temple being provided with formations molded thereon and detachably interengageable.

12. Eyeglasses defined in claim 1 wherein the actuator includes a power source and a battery-operated depth perception circuitry automatically actuating displacement of the pair of lenses.

13. Eyeglasses defined in claim 1 wherein each temple piece is formed with a respective pair of front and rear frames pivotally interconnected with each other to bring the rear frames in a folded position of eyeglasses.

14. Eyeglasses comprising:

a pair of eyepieces attached to one another;

a pair of temple pieces each formed with a respective front portion;

a pair of lenses attached to one another, a pair of side rails flanking said pair of lenses therebetween and fixed thereto, each of the side rails being slidably received by the front portion of the respective one of said pair of the temple pieces;

a pinion and rack mechanism mounted between the respective one of said pair of the temple pieces and the side rail for axial displacement of the side rails relative to the temple pieces; and a cross axle carrying the pinion on opposite ends thereof for synchronous rotation thereof, the pair of lenses being displaceable between the normal position thereof in which the lenses are secured within the eyepieces and an extended position thereof in front of the eyepieces upon synchronous motion of the side rails.

15. Eyeglasses comprising:

a pair of eyepieces connected to one another;

a pair of temple pieces each formed with a respective front portion;

a pair of lenses, a pair of elongated side rails flanking said pair of lenses therebetween and fixed thereto, each of the side rails being slidably received by the front portion of the respective temple piece; and an actuator formed between a respective one of said pair of the temple pieces and the side rail and including:

a pair of rack teething each formed in a respective one of the side rails, a pair of battery-operated gearmotors each received in the interior of the respective temple piece and formed with a respective rotatable shaft, and a pair of worm gears each mounted rotatably fixed on the shaft of the respective gearmotor and engaging the rack teething of the respective side rail to synchronously displace the pair of lenses between the normal position thereof and an extended position in front of the eyepieces, and a programmable controller adapted to controllably operate displacement of the pair of lenses according to a preprogrammed sequence.

* * * * *